US 6,565,786 B2

(12) United States Patent
Teramoto et al.

(10) Patent No.: US 6,565,786 B2
(45) Date of Patent: May 20, 2003

(54) METHOD FOR PRODUCING FORMED ARTICLE FROM POLYPHOSPHORIC ACID SOLUTION

(75) Inventors: Yoshihiko Teramoto, Shiga (JP); Shoichi Uemura, Shiga (JP); Kiyoshi Hotta, Shiga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 219 days.

(21) Appl. No.: 09/734,046

(22) Filed: Dec. 12, 2000

(65) Prior Publication Data

US 2001/0007013 A1 Jul. 5, 2001

(30) Foreign Application Priority Data

Dec. 13, 1999 (JP) .............................. 11-353591

(51) Int. Cl.[7] .............................. D01D 1/10; D01D 5/06
(52) U.S. Cl. ........................................ 264/169; 264/184
(58) Field of Search ................................ 264/169, 184, 264/205, 233

(56) References Cited

U.S. PATENT DOCUMENTS 5,296,185 A * 3/1994 Chau et al. ................. 264/205
6,228,922 B1 * 5/2001 Wang et al. ................ 524/413

* cited by examiner

*Primary Examiner*—Leo B. Tentoni
(74) *Attorney, Agent, or Firm*—Morrison & Foerster LLP

(57) ABSTRACT

The present invention provides a method for producing a formed article from a dope comprising a polyphosphoric acid solvent and a polymer soluble in polyphosphoric acid, which includes using a production apparatus containing an apparatus for stirring and uniformly dispersing or homogenizing a dope and a pump apparatus for delivering the uniformly dispersed or homogeneous dope, wherein at least one of the apparatus and the pump apparatus has a part that comes into contact with the dope. According to the present invention, maintenance frequency of production facility due to the corrosion and elution of metal in a recovered solvent can be reduced, which in turn decreases the production cost.

3 Claims, No Drawings

METHOD FOR PRODUCING FORMED ARTICLE FROM POLYPHOSPHORIC ACID SOLUTION

FIELD OF THE INVENTION

The present invention relates to a production method of a formed article made from a high performance polymer, particularly a polymer superior in mechanical strength and heat resistance.

BACKGROUND OF THE INVENTION

Polymers having rigid units, such as a para bond of aromatic ring and the like, in the main chain have high heat resistance and are superior in dynamic properties. Of such polymers, polybenzazole has extremely high heat resistance. It is known that these polymers are polymerized and formed into articles in the presence of polyphosphoric acid as a solvent (Wolfe et al., Macromolecules, 1981, pp. 909 and 915). These polymers obtained by using such a polyphosphoric acid solvent have been evaluated as to the performance at a laboratory level, but have not been produced industrially until recently. Therefore, problems associated with the industrial practice of these polymers have not drawn much attention.

In a reactor where a shear force is applied during polymerization and processing of these high performance polymers into a fiber, film and the like, in a pump that delivers a polymer solution, and in a pump that discharges a given amount of the polymer solution from a spinneret, the temperature is often raised beyond 160° C. during the step to reduce the viscosity coefficient of the polymer solution to a level sufficient to facilitate the processing. In addition, the temperature may become still higher due to the heat generated by the shear force applied in the apparatus. In this event, conventional corrosion-resistant materials, such as SUS 316 L and Stellite (MITSUBISHI MATERIALS CORPORATION), are defective in that a part of an apparatus elutes out due to the corrosion of a metal by the action of polyphosphoric acid, which in turn makes the solvent nonrecyclable, and the service life of the apparatus is shortened.

SUMMARY OF THE INVENTION

It is therefore an object of the present invention to improve a material of conventional apparatuses used for polymerizing and processing high performance polymers in a polyphosphoric acid solvent, thereby to elongate the service life of reactors and pumps and to reduce the metal ion concentration of the solvent to be recycled.

That is, the present invention provides a method for producing a formed article from a dope comprising a polyphosphoric acid solvent and a polymer soluble in polyphosphoric acid, which comprises using a production apparatus comprising an apparatus for stirring and uniformly dispersing or homogenizing a dope and a pump apparatus for delivering the uniformly dispersed or homogeneous dope, wherein at least one of the apparatus and the pump apparatus has a part that comes into contact with the dope, which part is made of a corrosion-resistant material having a material elution rate of not more than 1 (mm/year) in a 116% polyphosphoric acid at 210° C.

Preferably, the present invention provides a method for producing a formed article from a polyphosphoric acid solution, wherein a corrosion-resistant material has a hardness of not less than HRC 20.

The present invention also provides a method for producing a formed article from a dope comprising a polyphosphoric acid solvent and a polymer soluble in polyphosphoric acid, which comprises using a filter made of a corrosion-resistant material having a material elution rate of not more than 0.1 (mm/year) in 116% polyphosphoric acid at a filtering temperature, before discharge of the dope from a spinneret.

DETAILED DESCRIPTION OF THE INVENTION

The present invention is described in detail in the following.

The polymer to be used in the present invention is, for example, PBO (polybenzazole), PBT (polybenzothiazole) and PBI (polybenzoimidazole) homopolymers, their random, sequential and block copolymers, derivatives thereof, a polymer comprising a part thereof as a main chain, and the like, such as those described in Wolfe et al., Liquid Crystalline Polymer Compositions, Process and Products, U.S. Pat. No. 4,703,103 (Oct. 27, 1987); Wolfe et al., Liquid Crystalline Polymer Compositions, Process and Products, U.S. Pat. No. 4,533,692 (Aug. 6, 1985); Wolfe et al., Liquid Crystalline Poly(2,6-Benzothiazole) Compositions, Process and Products, U.S. Pat. No. 4,533,724 (Aug. 6, 1985); Wolfe et al., Liquid Crystalline Polymer Compositions, Process and Products, U.S. Pat. No. 4,533,693 (Aug. 6, 1985); Evers, Thermoxdatively Stable Articulated p-Benzobisoxazole p-Benzobisthiazole Polymers, U.S. Pat. No. 4,359,567 (Nov. 16, 1982); Tsai et al., Method for Making Heterocyclic Block Copolymer Compositions, Process and Products, U.S. Pat. No. 4,578,432 (Mar. 25, 1986); 11 Ency. Poly. Sci. & Eng., Polybenzothiazoles and Polybenzoxazoles, 601 (J. Wiley & Sons 1988) and W. W. Adams et al., The Materials Science and Engineering of Rigid-Rod Polymers, (Materials Research Society 1989). The present invention particularly relates to a production method for processing these polymers by the use of a polyphosphoric acid solvent.

The polymer can be of an AB type represented by chemical formulas (c) and (d) and/or an AA/BB type represented by chemical formulas (a) and (b) mentioned below.

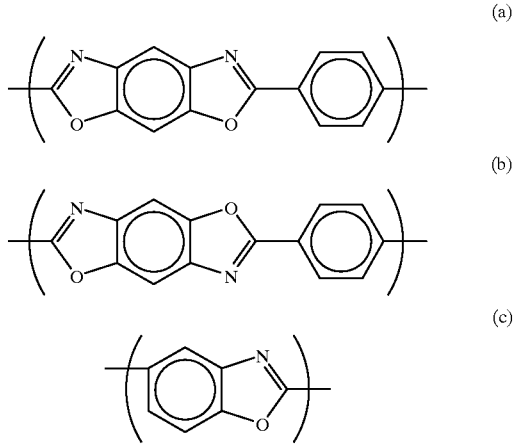

(d)

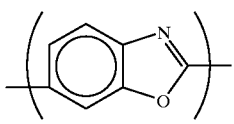

The aromatic group can be a hetero ring such as a pyridinylene group, wherein the ring is preferably formed by carbon. The aromatic group can be either a polycyclic condensed ring or a polycyclic non-condensed ring. Preferred is a 6-membered ring. While the size of the ring is not subject to any particular limitation, the aromatic group preferably contains not more than 18 carbon atoms, more preferably not more than 12 carbon atoms, still more preferably not more than 6 carbon atoms. The AA/BB type unit preferably has a 1,2,4,5-phenylene structure or an analog thereof. The AB type unit preferably has a 1,3,4-phenylene structure or an analog thereof.

The azole ring of the AA/BB type unit can be either of a cis type or trans type as shown in 11 Ency. Poly. Sci. & Eng., Polybenzothiazoles and Polybenzoxazoles, 601 (J. Wiley & Sons 1988).

The repeating units used in the present invention preferably have the structures shown in (a)–(h), more preferably the structures shown in (a)–(f), still more preferably the structures shown in (a)–(d).

(e)

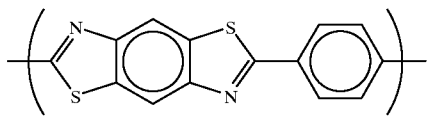

(f)

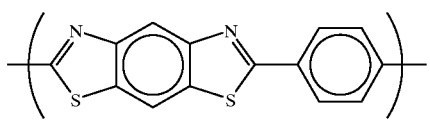

(g)

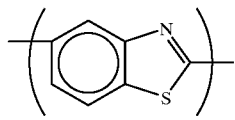

(h)

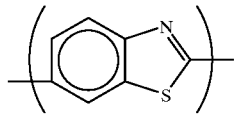

(i)

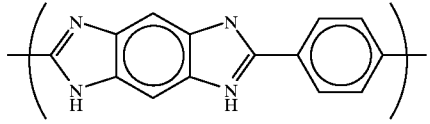

(j)

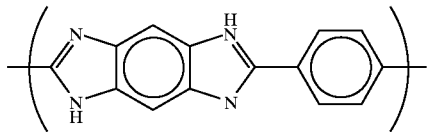

(k)

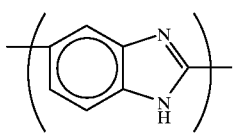

(l)

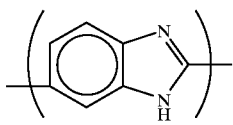

The PBZ polymer preferably has not less than about 25 repeating units on average. More preferably it preferably has not less than about 50 repeating units, and still more preferably repeating units of not less than about 100. The AA/BB-PBZ rigid chain preferably has an intrinsic viscosity as measured in methanesulfonic acid at 25° C. of about not less than 10 dl/g, more preferably not less than about 15 dl/g, still more preferably about not less than 20 dl/g. For a certain use, the intrinsic viscosity is most preferably about 25–30 dl/g. The intrinsic viscosity can be up to 60 dl/g, but preferably not more than 40 dl/g. A semi-rigid AB-PBZ polymer preferably has an intrinsic viscosity of not less than about 5 dl/g, more preferably not less than about 10 dl/g, and still more preferably not less than about 15 dl/g.

This polymer and a copolymer are obtained by reacting a monomer or oligomer in a polyphosphoric acid solvent to achieve a desired number of repeating units.

To overcome the defects of a formed article and stabilize its quality, it is extremely important to eliminate inconsistent density of a polymer to be formed in a polyphosphoric acid solvent and to use a homogeneous solution. As used herein, by the solution is meant a nematic crystalline liquid having small polydomain. The reactor usable in the present invention includes a twin screw kneader, a single screw reactor, a single screw extruder combined with a dispersing element, and a twin screw extruder. It is particularly preferable to use a reactor capable of handling a highly viscous material.

The concentration of polyphosphoric acid to be used as a solvent is not subject to any particular limitation, but it is preferably 112–120%, more preferably 114–117%.

In addition, the concentration of a polymer to be dissolved in the polyphosphoric acid solvent is not subject to any particular limitation, either, but it is preferably 4–22 wt %, more preferably 5–20 wt %.

The pump usable in the present invention includes a gear pump, Mohno pump, a screw feeder and the like. A gear pump that can stand a high discharge pressure is particularly useful. A particularly large equipment should have a pressure raising capability corresponding to the viscous resistance during delivery in a long polymer production line.

To reduce the amount of a metal dissolved in phosphoric acid from an apparatus, a sliding part of the apparatus, which is lubricated with the polyphosphoric acid solution, should be made of a material having high resistance to phosphoric acid corrosion, and high hardness and high abrasion resistance. A formed article may be processed from a base material or from a coated material (e.g., detonation process). It is preferable to employ a flame spraying method capable of affording a formed article having a desired composition and pore free texture.

Examples of the phosphoric acid corrosion-resistant material include nickel alloy (e.g., Hastelloy), tantalumniobium alloy, cobalt alloy, ceramics (e.g., graphite and alumina). Of these, nickel alloy is particularly superior. In addition, a nickel based tungsten carbide alloy and a nickel alloy base material treated with HIP (Hot Isostatic Pressing), which are superior in abrasion resistance, are preferable. While coating with cermet or carbon nitride is useful, the corrosion resistance of the base material and the thickness of the coating should be appropriately set to prevent degradation in the property due to pinholes. When different kinds of materials are used in combination, thermal expansion and residual stress at the joint should be taken into consideration.

The polyphosphoric acid solution processed in the present invention can dissolve a corrosion resistant metal, such as a stainless steel, at a temperature exceeding 160° C. As a result, the clearance of a reactor and a pump varies, which in turn lowers the dispersing or homogenizing capability and delivery capability with the lapse of time. In addition, because metal ion elutes out in a phosphoric acid solvent, the solvent inevitably changes in quality when used for recycling. It is extremely difficult to adsorb the metal ion once eluted out in a solvent and purify the solvent. Thus, the metal elution during the forming process of a polymer should be made as small as possible.

To effectively decrease corrosion of apparatuses and pipes due to polyphosphoric acid, the temperature during the step should be lowered. When the polymerization degree of a polymer to be formed is high, the polyphosphoric acid solution comes to have a high viscosity coefficient, which imposes the lower limit of the temperature. When the temperature in a reactor is high, the reaction time can be shortened and an apparatus can be made smaller, which in turn results in the reduction of facility costs. Thus, a reactor is desired to be operable at high temperatures.

The present invention is explained by taking polybenzbisoxazole as an example of a high performance polymer material processed using a polyphosphoric acid solvent. The preferable temperature for producing a fiber from an about 14 wt % polyphosphoric acid solution containing a polybenzbisoxazole polymer having a polymerization degree of about 200 is not less than 165° C., more preferably not less than 170° C. This solution has a high viscosity at 170° C. of 1000 Pa·s (shear rate 10·1/second, reciprocal second). Therefore, the heat from shear energy in a reactor and a pump is largely lost and the temperature of the solution rises remarkably. When a typical corrosion-resistant material is used, the corrosion advances, and abrasion of an apparatus and unpreferable elution of metal ion into a solvent proceed. This has a consequence that the apparatus parts need to be replaced sooner in several months and a solution may have a higher metal ion concentration.

The material of an apparatus to be used for processing a polyphosphoric acid solution at a high temperature needs to be particularly superior in corrosion resistance to phosphoric acid. The corrosion resistance to phosphoric acid can be easily evaluated at a high temperature. The evaluation may be made at a temperature higher than the actual processing temperature. The use of a material superior in corrosion resistance leads to stable industrial production. The evaluation in the present invention includes measurement of a decrease in weight after immersing a material in a 116% polyphosphoric acid at 210° C. or a given temperature for 40 hours. When the evaluation temperature is lower than 210° C., the material elutes out in a small amount which is difficult to measure. When it is not less than 230° C., the glass of the evaluation vessel may elute out to the degree that the evaluation is not available. While the polyphosphoric acid is not subject to any particular limitation as regards its concentration, a 116% polyphosphoric acid easily obtainable from the market is conveniently used. The immersion time is generally 40 hours, and the obtained value is converted to the amount of elution for 24 hours. A material having high corrosion resistance may be subjected to the evaluation for about 100 hours and a material having insufficient corrosion resistance may be subjected to the evaluation for about a shortened period of 4 hours. As long as the evaluation results enable judgement of whether or not a decrease rate to be mentioned later would exceed 1 (mm/year), the evaluation time does not count much here.

A corrosion-resistant material used in the present invention, for instance, for processing a 14 wt % solution of polybenzbisoxazole having a polymerization degree of 200 at 180° C., must show corrosion resistance (elution rate) of not more than 1 (mm/year), preferably not more than 0.5 (mm/year), more preferably not more than 0.1 (mm/year).

A reactor and a pump in which to process a polyphosphoric acid solution is lubricated with a polyphosphoric acid solution. Nevertheless, abrasion due to rubbing of parts and dissolution in phosphoric acid occur simultaneously. It is therefore essential to increase hardness of the material to achieve a prolonged service life of a twin screw extruder and a gear pump. As a material suitable for such use, Stellite has been used. However, its corrosion resistance to phosphoric acid is insufficient to stand a long term use. The materials suitable for the present invention are nickel alloy such as Plasthard (MITSUBISHI MATERIALS CORPORATION), tungsten carbide-containing nickel alloy, and the like. A material sufficient in resistance to abrasion by sliding has a hardness of preferably not less than HRC 20, more preferably not less than HRC 40, still more preferably not less than HRC 50. A material superior in corrosion resistance and having high hardness is exemplified by the aforementioned WC-containing material and a nickel alloy.

From the aspect of metal elution during production, the use of a corrosion-resistant material as a filtering member can provide a high effect, since it comes into contact with the liquid in a large area. In general, a filtering member consists of thin wires having a size of not more than 100 $\mu$m. Even SUS 316 loses the strength of the filtering member in a short time, thus, failing to function as a filter. The elution rate of SUS 316 L in 116% polyphosphoric acid at 170° C. is 0.09 (mm/year). It doubles at 180° C. into 0.19 (mm/year). When a 100×800 mesh twilled woven SUS 316 L metal net was actually used, it was useable at 170° C. for 1 month. When it was used at 180° C., however, pieces of the metal net flew out in 2 weeks and the filter became useless. The elution rate is preferably lower, because a short period of continuous use means inconveniently greater amounts of polymer wasted due to replacement. Particularly preferable filtering materials include superstainless steel NAS354N (Nippon Yakin Kogyo Co., Ltd.) and Hastelloy C-22.

A polymer solution is filtered to prevent contamination of the formed article. The necessary filtering precision varies depending on the kind of the formed article. The filter traps anything having a size greater than that of a foreign material when in use for films. In case of a fiber, a solid material having a size that may be influential to the thread breakage during spinning needs to be trapped. A filter should be exchanged before it becomes rough and fails to maintain desired filtering accuracy due to the elution of the filter. In case a non-woven fabric made of thin wire is used, the wire itself gets broken, flows out and is contained in a product along with the progress of the elution. To prevent such inconvenience, a filter may be exchanged sooner. However, this increases the loss inevitably associated with the exchange and the amount of metal ion dissolved in a solvent. A preferable filter has corrosion resistance as expressed by material elution rate in 116% polyphosphoric acid at a filtering temperature of not more than 0.1 (mm/year), more preferably not more than 0.05 (mm/year), still more preferably 0.02 (mm/year).

The present invention is explained in detail in the following by referring to illustrative reference examples and examples. The present invention is not limited by these examples in any way. Unless specified, the amounts and % are in weight.

Evaluation of Elution Rate of Material in Phosphoric Acid Solvent

A material (thickness 2 mm, width 10 mm, length 30 mm) was washed with methyl alcohol and dried with air. It was weighed by an electric balance and placed in a Pyrex beaker having a diameter of 50 mm at room temperature together with 150 cc of 116% polyphosphoric acid. It was placed in hot-air circulation dryer (DS-64, Yamato Scientific Instruments) at 210° C. or a filtering temperature, and the beaker was taken out 40 hours later including the time (ca. 10 min) necessary for reaching a given temperature. It was slowly cooled at room temperature and phosphoric acid attached to the sample was wiped. The beaker was washed with running water for 5 min, immersed in purified water for 1 hour and air dried. The sample was weighed by an electric balance and a decrease rate was determined based on the decrease in weight, surface area of the sample and material density. In consideration of the nature of the solution to be handled, the corrosion resistance was not evaluated with regard to polyphosphoric acid in a flowing state, but otherwise (natural convection alone), as mentioned above, from which the elution rate of the material in phosphoric acid was calculated.

$$\text{Decrease rate (mm/year)} = \frac{\text{lost mass (g)}}{\text{density (g/cc)}} \times \frac{8760 \text{ (hr/year)}}{\text{heating time (hr)}} \times \frac{1000 \text{ (mm}^3\text{/cc)}}{\text{surface area (mm}^2\text{)}}$$

Hardness

Expressed by the Rockwell hardness, C scale value as defined in JIS Z 2245 (1998).

EXAMPLE 1

A 14% polyphosphoric acid solution containing cis-polybezoxazole polymer having an intrinsic viscosity of 30 dl/g was kneaded in a twin screw extruder having a nominal diameter of 90 mm and L/D=30 at 200° C. The pressure was raised to 20 MPa with a 150 cc/rev gear pump set on the tip thereof and the polymer was supplied at a flow rate of 400 kg/hr. The polymer dope temperature at the discharge end of the twin screw extruder then was 205° C., wherein the material of the apparatus was Hastelloy C-276 for the screws and barrel of the twin screw extruder and Igetalloy M23S manufactured by Sumitomo Electric Industries, Ltd. for a liquid contact part of the gear pump. The apparatus was continuously run for 5 months. The gear pump showed no decrease in the discharge efficiency, and the production was stably continued.

The elution rate of Hastelloy C-276 and Igetalloy M23S at 210° C. in 116% phosphoric acid was 0.07 mm/year and 0.08 mm/year, respectively.

COMPARATIVE EXAMPLE 1

In Example 1, a gear pump was produced using Stellite #3. As a result, the delivery efficiency from the gear pump at a polymer solution temperature of 205° C. decreased from 95% to 76% in 3 months. Thus, the gear pump had to be changed to a new one.

The elution rate of Stellite #3 at 210° C. into 116% phosphoric acid was 4.1 mm/year.

EXAMPLE 2

In Example 1, cylinders were all made from MA Plasthard-S manufactured by MITSUBISHI MATERIALS CORPORATION. Even after 6 months' operation, the inner wall of the cylinders was free of scratches of not less than 0.05 mm in size.

The elution rate of MA Plasthard-S at 210° C. in 116% phosphoric acid was 0.16 mm/year. The hardness was HRC 40.

COMPARATIVE EXAMPLE 2

A 14% polyphosphoric acid solution containing cis-polybezoxazole polymer having an intrinsic viscosity of 30 dl/g was kneaded in a twin screw extruder having a nominal diameter of 30 mm and L/D=35 at 197° C. The pressure was raised to 13 MPa with a 10 cc/rev gear pump set on the tip thereof and the polymer was supplied at a flow rate of 20 kg/hr. The polymer dope temperature at the discharge end of the twin screw extruder then was 200° C., wherein the material of the apparatus was Stellite #6 for both the screws and barrel of the twin screw extruder, and a liquid contact part of the gear pump. The apparatus was intermittently run for a total of 3 months, and the production was stably continued.

The clearance expanded from 0.3 mm to 1.1 mm due to the elution of the material of the extruder, and the discharge efficiency of the gear pump decreased from 95% to 77%. The metal ion concentration of the 10% aqueous orthophosphoric acid solution recovered during the operation was measured, as a result of which chromium ion was detected by 10 ppm.

The elution rate of Stellite #6 at 210° C. in 116% phosphoric acid was 3.5 mm/year and the hardness was HRC 44. It was found that poor corrosion resistance prevented utilization thereof in a production facility.

EXAMPLE 3

COMPARATIVE EXAMPLE 3

A spinning dope containing polybezoxazole (14.0%) obtained by the method described in U.S. Pat. No. 4,533,693 and having an intrinsic viscosity in a methanesulfonic acid solution at 30° C. of 28.4 dL/g, and polyphosphoric acid having a phosphorus pentaoxide content of 83.2% was spun. The dope was kneaded and defoamed in a twin screw kneader and the pressure was raised with a gear pump to deliver the polymer solution to a spin pack set in a spinning head through a pipe kept at 175° C. The inside of the spin pack had a structure that made the solution pass a 800×100 twilled woven metal net made of Hastelloy C-22 (wire diameters 0.065 mm and 0.1 mm). The polymer solution was spun from a spinneret having 664 holes at 175° C., and the spun yarn was cooled with cooling air at 60° C. and introduced into a coagulation bath. The yarn was taken up at a spinning rate of 350 m/min and continuously spun, coagulated, washed with water (neutralization) and dried on line to give a highly strong polybenzbisoxazole fiber having a strength of 38 cN/decitex and 1112 decitex, both on average. This spin pack was continuously used for one month. As a result, thread breakage occurred 0.07 time/day (Example 3) on average. When the polymer solution was spun from a spinneret having 664 holes at 175° C. by a spin pack equipped with a 800×100 mesh twilled woven metal net (wire diameters 0.065 mm and 0.1 mm) made of SUS 316 L instead of Hastelloy C-22 set alongside in the spinning head, a highly strong polybenzbisoxazole fiber having a strength of 38 cN/decitex and 1115 decitex, both on average, was obtained. While there occurred no thread breakage for the initial 10 days of operation using this spin pack, the thread breakage occurred once a day thereafter. On day 13, the spin pack was dismantled, and the metal thin wire was found to have become thinner to the point it could be seen through, with frequent breakage of the wire.

The elution rates of Hastelloy C-22 and SUS 316 L at 175° C. in 116% phosphoric acid were 0.01 mm/year and 0.13 mm/year, respectively. It was found that SUS 316 L could not be used as a filter for a polybezazole solution at 175° C.

When a highly metal-corrosive solvent such as polyphosphoric acid is used for processing a high performance polymer, a material having high corrosion resistance should be used to prevent the problems of possible corrosion of an apparatus and elution of metal in a recovered solvent. According to the present invention, maintenance frequency of production facility due to the corrosion and elution of metal in a recovered solvent can be reduced, which in turn decreases the production cost.

This application is based on a patent application No. 11-353591 filed in Japan, the content of which is hereby incorporated by reference.

What is claimed is:

1. A method for producing a formed article from a dope comprising a polyphosphoric acid solvent and a polymer soluble in polyphosphoric acid, comprising:

stirring the dope in a stirring apparatus to uniformly disperse or homogenize the dope;

delivering the uniformly dispersed or homogenized dope by a pump apparatus; and forming an article from the delivered dope, wherein at least one of the stirring apparatus and the pump apparatus has a part that comes into contact with the dope, the part being made of a corrosion-resistant material having a material elution rate of not more than 1 (mm/year) in 116% polyphosphoric acid at 210° C.

2. The method of claim 1, wherein the corrosion-resistant material has a hardness of not less than HRC 20.

3. A method for producing a formed article from a dope comprising a polyphosphoric acid solvent and a polymer soluble in polyphosphoric acid, comprising:

filtering the dope using a filter made of a corrosion-resistant material having a material elution rate of not more than 0.05 (mm/year) in 116% polyphosphoric acid at 175° C.;

discharging the filtered dope from a spinner; and forming an article from the discharged dope.

* * * * *